United States Patent
Brahmaroutu et al.

(10) Patent No.: US 8,904,105 B2
(45) Date of Patent: Dec. 2, 2014

(54) SYSTEM AND METHOD FOR PERFORMING RAID I/O OPERATIONS IN PCIE-BASED STORAGE RESOURCES

(75) Inventors: Surender Brahmaroutu, Round Rock, TX (US); Gary B. Kotzur, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 932 days.

(21) Appl. No.: 13/048,327

(22) Filed: Mar. 15, 2011

(65) Prior Publication Data

US 2012/0239849 A1    Sep. 20, 2012

(51) Int. Cl.
G06F 12/16 (2006.01)
G06F 3/06 (2006.01)
G06F 11/10 (2006.01)
G06F 11/20 (2006.01)

(52) U.S. Cl.
CPC ............ *G06F 11/1084* (2013.01); *G06F 3/061* (2013.01); *G06F 3/0638* (2013.01); *G06F 3/0689* (2013.01); *G06F 3/0659* (2013.01); *G06F 11/2087* (2013.01)
USPC .......................................... 711/114; 711/202

(58) Field of Classification Search
None
See application file for complete search history.

(56) References Cited

U.S. PATENT DOCUMENTS

| 5,526,507 | A | * | 6/1996 | Hill | 711/114 |
| 6,029,227 | A | * | 2/2000 | Uchimura | 711/114 |
| 7,464,174 | B1 | | 12/2008 | Ngai | 709/234 |
| 7,500,115 | B2 | | 3/2009 | Berke et al. | 713/300 |
| 7,562,176 | B2 | | 7/2009 | Kloeppner et al. | 710/314 |
| 7,734,858 | B2 | | 6/2010 | Loffink et al. | 710/313 |
| 7,801,120 | B2 | | 9/2010 | Steinmetz et al. | 370/360 |
| 2006/0265656 | A1 | | 11/2006 | Lambert et al. | 715/705 |
| 2007/0011383 | A1 | | 1/2007 | Berke et al. | 710/301 |
| 2009/0106493 | A1 | * | 4/2009 | Tsuji | 711/114 |
| 2010/0125653 | A1 | | 5/2010 | Cherian et al. | 709/223 |
| 2010/0169573 | A1 | * | 7/2010 | Tsuji | 711/114 |
| 2012/0166699 | A1 | * | 6/2012 | Kumar et al. | 710/306 |
| 2012/0166909 | A1 | * | 6/2012 | Schmisseur et al. | 714/758 |

OTHER PUBLICATIONS

Pending U.S. Appl. No. 12/828,686 entitled Peripheral Component Interconnect Express Root Port Mirroring filed Jul. 1, 2010, 24 pages.

* cited by examiner

*Primary Examiner* — Kaushikkumar Patel

(74) *Attorney, Agent, or Firm* — Baker Botts L.L.P.

(57) ABSTRACT

Systems and methods for performing RAID I/O operations in PCIe-based storage resources are disclosed. In accordance with embodiments of the present disclosure, a method for performing a read operation may be provided. The method may include overlaying memory address space of storage resources of a source logical unit for the read operation onto a destination address. The method may also include determining whether the source logical unit is a RAID0 array. The method may additionally include generating a source address in a receive buffer for each storage resource of the source logical unit if the source logical unit is a RAID0 array. The method may further include storing data received from each storage address of the logical unit at the generated source address of the receive buffer associated with such storage resource.

16 Claims, 4 Drawing Sheets

SYSTEM AND METHOD FOR PERFORMING RAID I/O OPERATIONS IN PCIE-BASED STORAGE RESOURCES

TECHNICAL FIELD

The present disclosure relates in general to information handling systems, and more particularly to performing RAID I/O operations in PCIe-based storage resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of physical storage resources, such as a Redundant Array of Independent Disks (RAID), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a server chassis, to hundreds of physical storage resources disposed in one or more separate storage enclosures.

For many years, physical storage resources were typically implemented using magnetic storage media. However, in recent years, the industry has shifted to using solid-state storage devices in place of magnetic storage media. Solid-state storage devices may be desirable over magnetic storage media due to reduced latency, higher performance, fewer mechanical components, and other reasons.

To fully take advantage of the reduced latency of solid-state storage devices, manufacturers of information handling systems are increasingly using Peripheral Component Interconnect Express (PCIe) as an interface between an information handling system and its associated storage resources. Traditionally, in such PCIe-based implementations, to perform RAID, a software-based RAID controller executing on the information handling system is required. Software-based RAID controllers may be undesirable as they may consume resources of the information handling system. However, availability of hardware-based RAID controllers for PCIe-based solid state storage devices is sparse. In addition, even if such hardware-based RAID controllers were readily available, they may pose constraints such as power consumption, system real estate, and performance.

SUMMARY

In accordance with the teachings of the present disclosure, the disadvantages and problems associated with performing RAID input-output (I/O) operations in storage-based storage resources have been reduced or eliminated.

In accordance with embodiments of the present disclosure, a method for performing a read operation may be provided. The method may include overlaying memory address space of storage resources of a source logical unit for the read operation onto a destination address. The method may also include determining whether the source logical unit is a RAID0 array. The method may additionally include generating a source address in a receive buffer for each storage resource of the source logical unit if the source logical unit is a RAID0 array. The method may further include storing data received from each storage address of the logical unit at the generated source address of the receive buffer associated with such storage resource.

In accordance with additional embodiments of the present disclosure, a method for performing a write operating may be provided. The method may include overlaying memory address space of storage resources of a destination logical unit for the write operation onto a source address. The method may also include determining whether the destination logical unit is a RAID0 array. The method may additionally include generating a source address for each storage resource of the destination logical unit if the destination logical unit is a RAID0 array. The method may further include multicasting a plurality of transaction layer packets, each transaction layer packet associated with a corresponding storage resource of the destination logical unit.

In accordance with further embodiments of the present disclosure, a Peripheral Communication Interconnect Express (PCIe) switch may be provided. The PCIe switch may be configured to: (i) interface between an information handling system and a plurality of storage resources; (ii) overlay memory address space of a source logical unit for a read operation onto a destination address, the source logical unit including two or more of the plurality of storage resources; (iii) determine whether the source logical unit is a RAID0 array; (iv) if the source logical unit is a RAID0 array, generate a source address in a receive buffer for each storage resource of the source logical unit; and (v) store data received from each storage address of the logical unit at the generated source address of the receive buffer associated with such storage resource.

In accordance with additional embodiments of the present disclosure, a Peripheral Communication Interconnect Express (PCIe) switch may be provided. The PCIe switch may be configured to: (i) interface between an information handling system and a plurality of storage resources; (ii) overlay memory address space of a destination logical unit for the write operation onto a source address, the destination logical unit including two or more of the plurality of storage resources; (iii) determine whether the destination logical unit is a RAID0 array; (iv) if the destination logical unit is a RAID0 array, generate a source address for each storage resource of the destination logical unit; and (v) multicast a plurality of transaction layer packets, each transaction layer packet associated with a corresponding storage resource of the destination logical unit.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
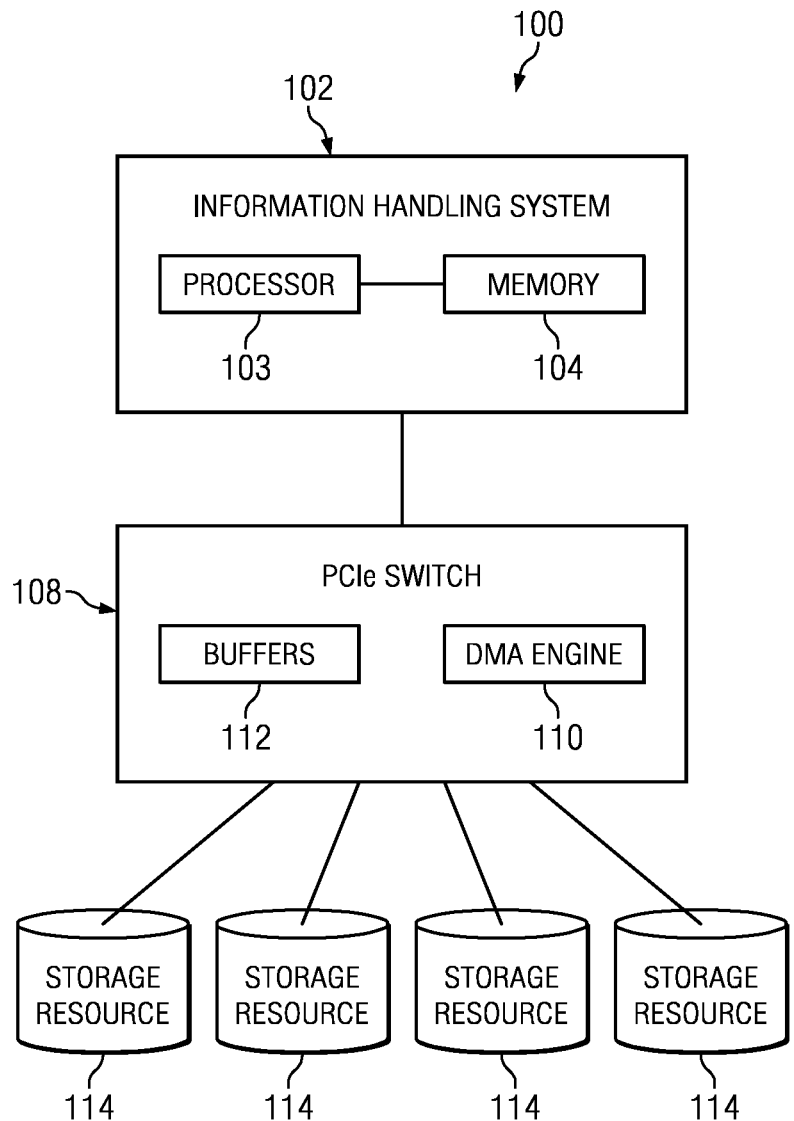
FIG. 1 is a block diagram of an example system for performing RAID I/O operations in PCIe-based storage resources, in accordance with certain embodiments of the present disclosure.
Figure 2:
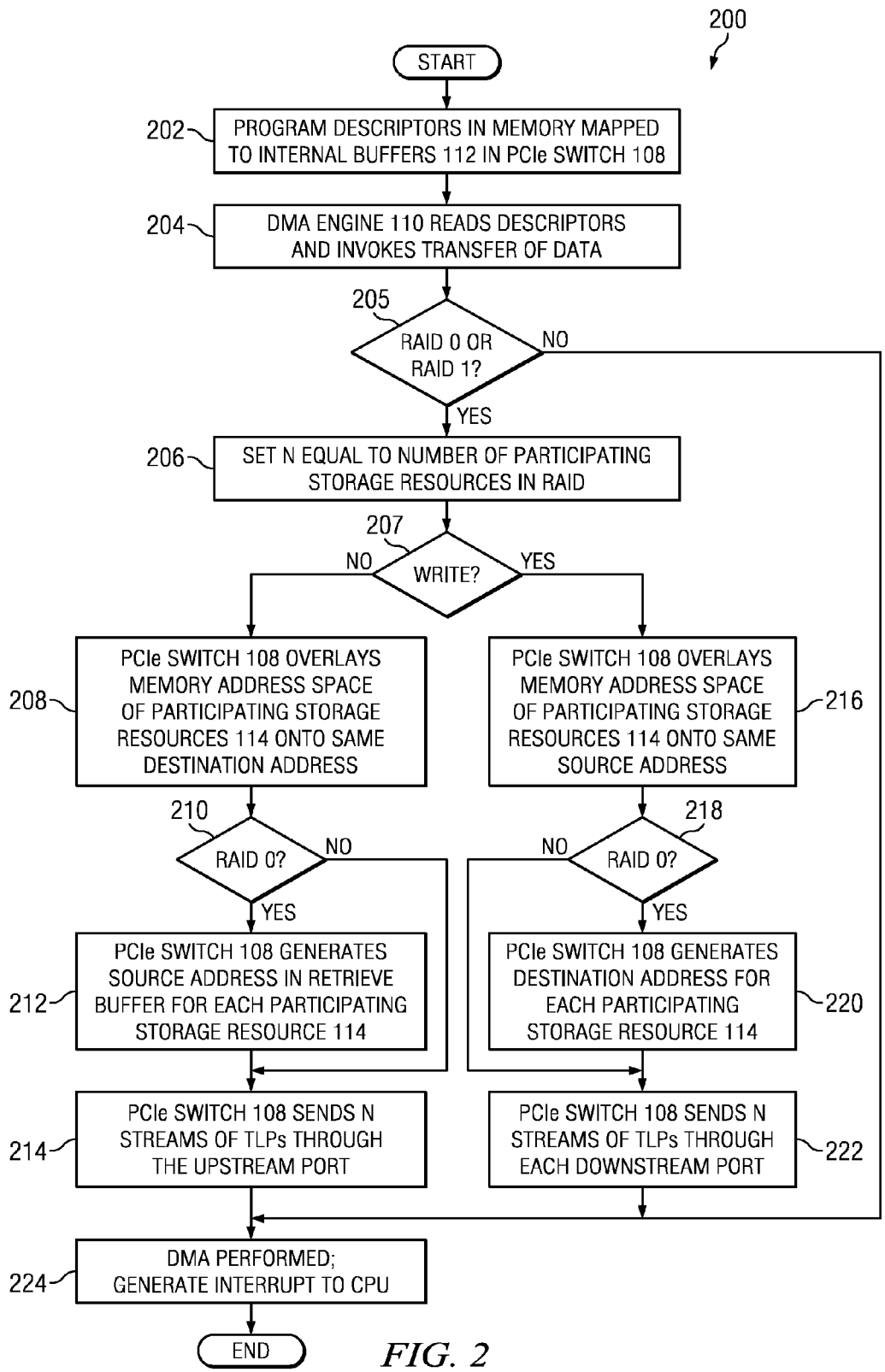
FIG. 2 is a flow chart of an example method for performing RAID I/O operations in PCIe-based storage resources, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

As discussed above, an information handling system may include or may be coupled to an array of physical storage resources. The array of physical storage resources may include a plurality of physical storage resources, and may be operable to perform one or more input and/or output storage operations, and/or may be structured to provide redundancy. In operation, one or more physical storage resources disposed in an array of physical storage resources may appear to an operating system as a single logical storage unit or "logical unit."

In certain embodiments, an array of physical storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID levels, including without limitation, standard RAID levels (e.g., RAID 0, RAID 1, RAID 3, RAID 4, RAID 5, and RAID 6), nested RAID levels (e.g., RAID 01, RAID 03, RAID 10, RAID 30, RAID 50, RAID 51, RAID 53, RAID 60, RAID 100), non-standard RAID levels, or others.

FIG. 1 illustrates a block diagram of an example system for performing RAID I/O operations in PCIe-based storage resources, in accordance with certain embodiments of the present disclosure. As depicted in FIG. 1, system 100 may include an information handling system 102, a Peripheral Component Interconnect Express (PCIe) switch 108, and a plurality of storage resources 114.

Information handling system 102 may generally be operable to receive data from and/or communicate data to one or more of the plurality of resources 114. In certain embodiments, information handling system 102 may be a server. In another embodiment, information handling system 102 may be a personal computer (e.g., a desktop computer or a portable computer). As depicted in FIG. 1, information handling system 102 may include a processor 103 and a memory 104 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

PCIe switch 108 may include any system, device, or apparatus configured to provide an input/output (I/O) interface between information handling system 102 and peripheral devices in accordance with the PCIe standard. For example, PCIe switch 108 may provide an interface between information handling system 102 and storage resources 114. In accordance with the PCIe standard, PCIe switch may comprise a multi-ported switch.

As depicted in FIG. 1, PCIe switch 108 may include a direct memory access (DMA) engine 110 and buffers 112. DMA engine 110 may be any system, device, or apparatus configured to perform direct memory access operations. For example, DMA engine 110 may, in response to an I/O request (e.g., read or write) from information handling system 102, transfer copies of a block of data from one device to another (e.g., from memory 104 to a storage resource 114 or vice versa). In some embodiments, DMA engine 110 may use buffers 112 for temporary storage of data being transferred.

Buffers 112 may include any system, device, or apparatus configured to retain program instructions and/or data for a period of time (e.g., computer-readable media). Buffers 112 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to PCIe switch 108 is turned off.

Storage resources 114 may include hard disk drives, magnetic tape libraries, optical disk drives, magneto-optical disk drives, compact disk drives, compact disk arrays, disk array controllers, and/or any computer-readable medium operable to store data. In particular embodiments, storage resources 114 may comprise solid state storage devices. In some embodiments, storage resources 114 may form all or part of a redundant storage array (e.g., a RAID0 or RAID1 array). In such embodiments, storage resources 114 participating in the redundant storage array may appear to an operating system executing on information handling system 102 as a single logical storage unit or virtual resource. Thus, information handling system 102 may "see" a logical unit instead of seeing each individual physical storage resource 114.

In operation, DMA engine 110 may facilitate performance of I/O operations to storage resources 114 in a RAID configuration by constructing multicast descriptor rings in internal buffers 112 of PCIe switch 108. DMA engine 110 may also program DMA channels by writing to internal registers (which may be present in buffers 112) located on PCIe switch 108. Operation of various components of system 100 may be further illustrated by FIG. 2 and the following discussion.

FIG. 2 illustrates a flow chart of an example method 200 for performing RAID I/O operations in PCIe-based storage resources, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps 202-224 comprising method 200 may depend on the implementation chosen.

At step 202, processor 103 may program ring descriptors for each logical unit associated with information handling system 102 in memory mapped to internal buffers 112 in PCIe switch 108. A ring descriptor may include information regarding data to be transferred in connection with an I/O operation, including a source address, destination address, size of transfer, and/or other information. At step 204, DMA engine 110 may read ring descriptors and invoke transfers of data based on information stored in the ring descriptors.

At step 205, PCIe switch 108 may determine if an array that is the source or destination of an I/O operating is either of a RAID 0 or RAID 1 array. If either of a RAID 0 or RAID 1 array, method 200 may proceed to step 206. Otherwise, method 200 may proceed to step 224.

At step 206, PCIe switch 108 may set a variable N equal to the number of participating storage resources in the array.

At step 207, DMA engine 110 may determine if an I/O operation described in a ring descriptor is a write or read. If the operation is a read, method 200 may proceed to step 208. Otherwise, if the operation is a write, method 200 may proceed to step 216.

At step 208, in response to determination that an operation is a write operation, PCIe switch 208 may overlay memory address space of storage resources 114 participating in the source logical unit RAID onto the same destination address.

At step 210, PCIe switch 108 may determine if the source logical unit is a RAID 0 array or a RAID 1 array. If the source logical unit is a RAID 0 array (e.g., an array that utilizes striping to accomplish performance) method 200 may proceed to step 212. Otherwise, if the source logical unit is a RAID 1 array, method 200 may proceed to step 214.

Figure 3:
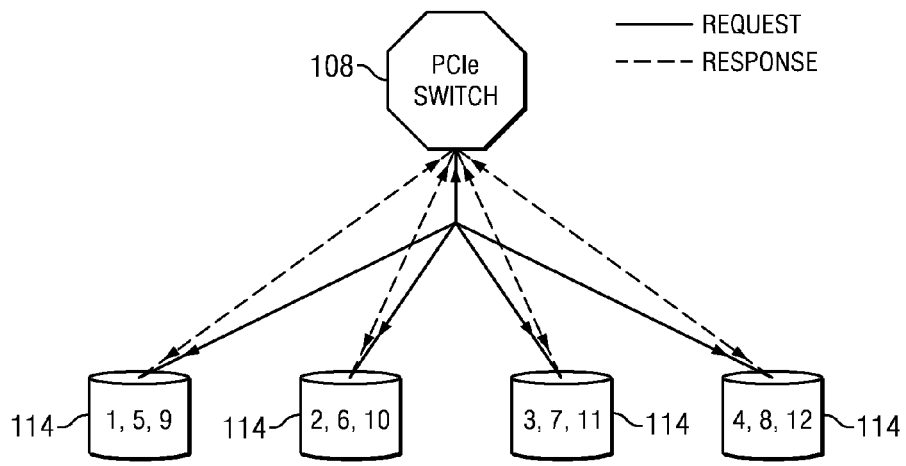
FIG. 3 is a block diagram illustrating striping in a RAID0 array, in accordance with certain embodiments of the present disclosure.
Figure 5:
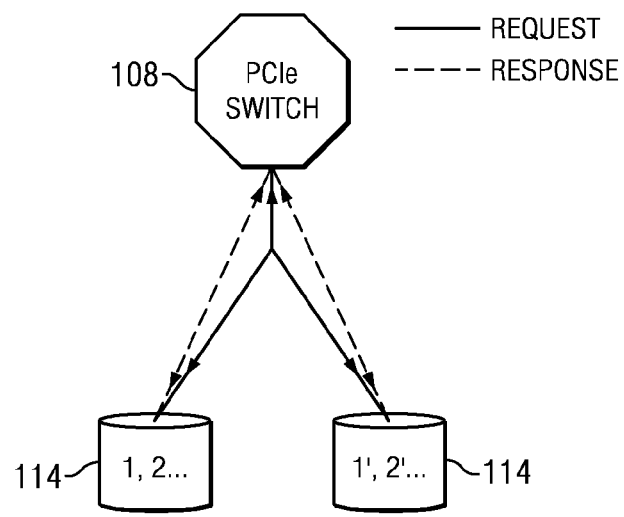
FIG. 5 is a block diagram illustrating mirroring in a RAID1 array, in accordance with certain embodiments of the present disclosure.

In a RAID0 implementations, contiguous data may be striped across storage resources 114 as shown in FIG. 3, where the order of data is represented by numerals 1, 2, 3, etc. On the other hand, and as shown in FIG. 5, in RAID1 implementations, contiguous data is stored on one storage resource (as represented by numerals 1, 2, etc.) and mirrored to another storage resource (as represented by numerals 1', 2', etc.). Accordingly, in RAID0 implementations, provision must be made in the PCIe switch 108 read buffers 112 to provide an offset for the fact that data originating from or being stored to similar addresses of the storage resources will require marshalling in order to effectively read or write striped data.

Figure 4:
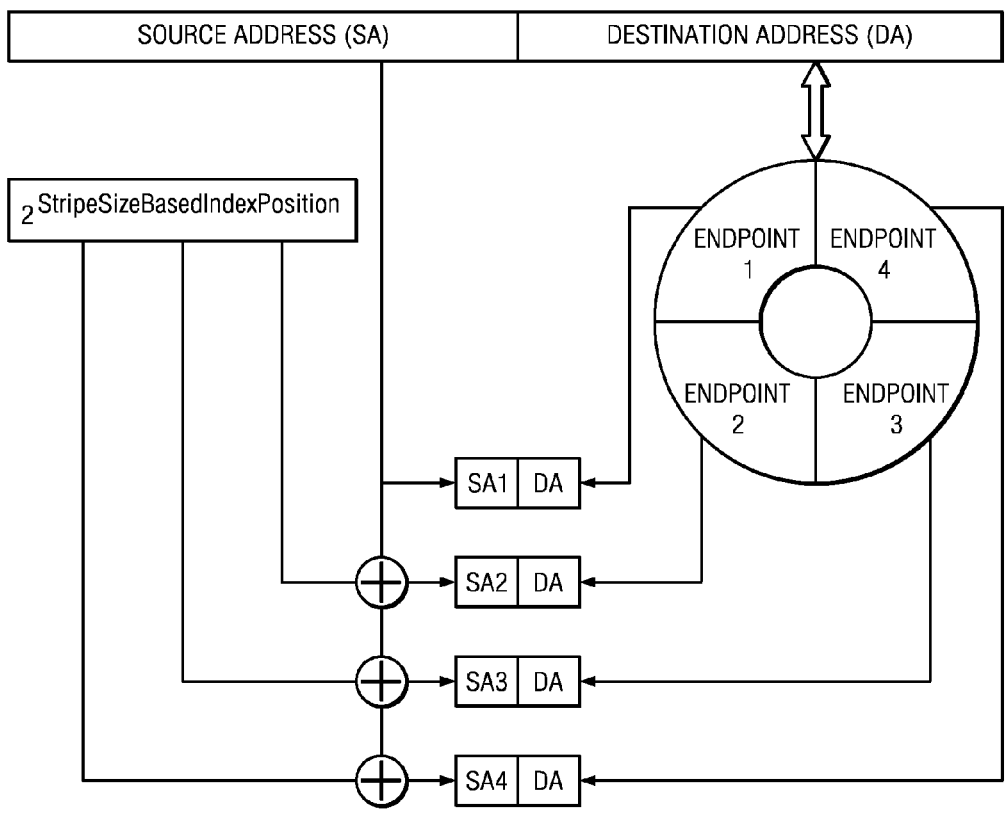
FIG. 4 is a block diagram illustrating data marshalling for I/O operations for a RAID0 array, in accordance with certain embodiments of the present disclosure.
Figure 6:
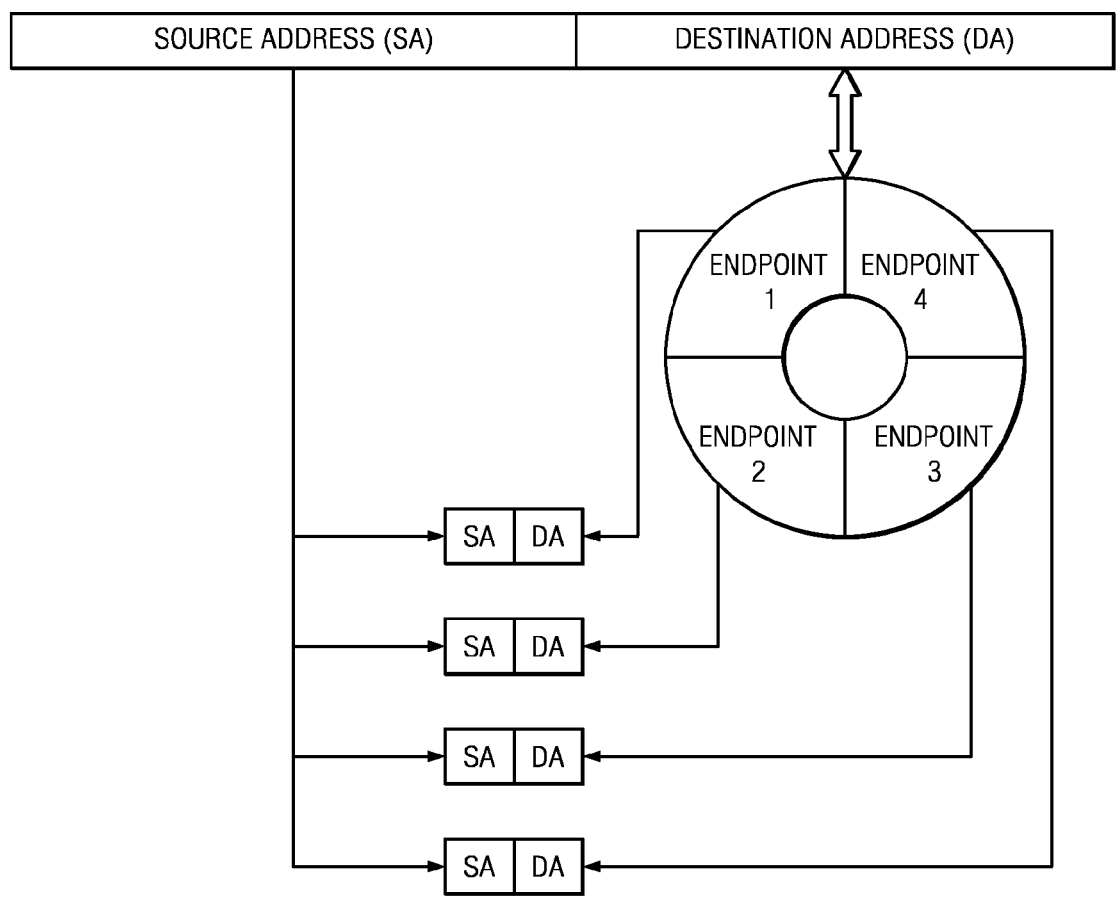
FIG. 6 is a block diagram illustrating that data marshalling for I/O operations for a RAID1 array is not needed, in accordance with certain embodiments of the present disclosure.

At step 212, PCIe switch 108 may generate a source address in its receive buffer for each participating storage resource 114 of the source logical unit, in order to facilitate reassembly of data read from participating storage resources 114. For example, PCIe switch 108 may perform marshalling of data read from storage resources 114 to ensure proper placement of the incoming data in the receive buffer. Thus, although each descriptor may include the same source address, data may be placed in PCIe switch 108's receive buffer at a location that is at an offset determined based on the storage resource 114 that is the origin of the incoming response, as shown in FIG. 4. As seen in FIG. 4, the source addresses in the receive buffer may be incremented by $2^{StripeSizeBasedIndexPosition}$, such that address offsets in the receive buffer are offset based on stripe length for the RAID 1 array. For example, in an embodiment in which stripe length is four kilobytes, for block 2 emanating from switch downstream port 2, PCIe switch 108 may advance the pointer by four kilobytes before the data is placed into the receive buffer and eight kilobytes for block 3 from downstream port 3 and so on. Thus the amount of offset added to the source address is determined by the RAID stripe length. As seen in FIG. 6, such marshalling and provisions of offsets is not required in RAID 1 configurations—in such configurations, PCIe switch 108 may only process the data received from the first storage resource 114 to respond to the read request.

At step 214, PCIe switch 108 may communicate N streams of transaction layer packets (TLPs) through its upstream port, wherein N is equal to the number of storage resources 114 participating in the source logical unit. Thus, a read request from PCIe switch 108 is replicated into multiple requests, one for each storage device.

At step 216, in response to determination that an operation is a read operation, PCIe switch 208 may overlay memory address space of storage resources 114 participating in the destination logical unit RAID onto the same source address.

At step 218, PCIe switch 108 may determine if the destination logical unit is a RAID 0 array or a RAID 1 array. If the destination logical unit is a RAID 0 array (e.g., an array that utilizes striping to accomplish redundancy) method 200 may proceed to step 220. Otherwise, if the destination logical unit is a RAID 1 array, method 200 may proceed to step 222.

At step 220, PCIe switch 108 may generate a destination address in its receive buffer for each participating storage resource 114 of the destination logical unit, in order to appropriately stripe data across participating storage resources 114. All the blocks of a write operation may be located at same logical block location on each storage resource. Thus, a write request may be communicated to all participating storage resources 114, and each storage resource may respond.

At step 222, PCIe switch 108 may multicast N streams of transaction layer packets (TLPs) through each of its downstream ports, wherein N is equal to the number of storage resources 114 participating in the source logical unit. Thus, a TLP originating from information handling system 102 is replicated by PCIe switch 108 into 4 TLPs each with an identical source information but with a different destination address, each address offset from the others based on a block size of the storage resources 114. After completion of step 214, method 200 may proceed to step 224.

At step 224, direct memory access operations may be performed based on the communicated TLPs, and an appropriate interrupt may be communicated to the processor 103. After completion of step 224, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

Although various functions have been described above as being performed by PCIe switch 108 in the embodiments described above, processor 103 or other components of information handling system 102 may perform some or all of such functions in other embodiments.

Using the methods and systems disclosed herein, problems associated with performing input/output operations in PCIe-based storage resource may be reduced or eliminated. As shown above, a PCIe switch may be used to perform various RAID-related tasks, thus reducing or eliminating the need to software-based RAID solutions or hardware-based RAID controllers.

Although the present disclosure has been described in detail, it should be understood that various changes, substitutions, and alterations can be made hereto without departing from the spirit and the scope of the disclosure as defined by the appended claims.

What is claimed is:

1. A method for performing a read operation, comprising:
   overlaying memory address space of storage resources of a source logical unit for the read operation onto a destination address, wherein the storage resources comprise solid state storage devices;
   generating a source address in a receive buffer in a Peripheral Component Interconnect Express (PCIe) switch for each storage resource of the source logical unit based upon a determination that the storage logical unit is a RAID0 array; and
   storing, at the generated source address of the receive buffer associated with each storage resource, data received from each storage resource of the logical unit.

2. A method according to claim 1, the read operation defined by a ring descriptor.

3. A method according to claim 1, each generated source address having an offset based on a stripe size of the source logical unit and its associated storage resource.

4. A method according to claim 1, further comprising communicating data stored in the receive buffer to an information handling system.

5. A method according to claim 4, the data stored in the receive buffer communicated via a transaction layer packet.

6. A method for performing a write operation, comprising:
   overlaying memory address space of storage resources of a destination logical unit for the write operation onto a source address, wherein the storage resources comprise solid state storage devices;
   generating a source address for each storage resource of the destination logical unit, based upon a determination that the destination logical unit is a RAID0 array; and
   multicasting, from a Peripheral Component Interconnect Express (PCIe) switch, a plurality of transaction layer packets, each transaction layer packet associated with a corresponding storage resource of the destination logical unit.

7. A method according to claim 6, the write operation defined by a ring descriptor.

8. A method according to claim 6, each generated destination address having an offset based on a stripe size of the source logical unit and its associated storage resource.

9. A Peripheral Communication Interconnect Express (PCIe) switch configured to:
   interface between an information handling system and a plurality of storage resources, wherein the storage resources comprise solid state storage devices;
   overlay memory address space of a source logical unit for a read operation onto a destination address, the source logical unit including two or more of the plurality of storage resources;
   generate a source address in a receive buffer in the PCIe switch for each storage resource of the source logical unit based upon a determination that the source logical unit is a RAID0 array; and
   store data received from each storage resource of the logical unit at the generated source address of the receive buffer associated with such storage resource.

10. A PCIe switch according to claim 9, the read operation defined by a ring descriptor.

11. A PCIe switch according to claim 9, each generated source address having an offset based on a stripe size of the source logical unit and its associated storage resource.

12. A PCIe switch according to claim 9, further configured to communicate data stored in the receive buffer to an information handling system.

13. A PCIe switch according to claim 12, the data stored in the receive buffer communicated via a transaction layer packet.

14. A Peripheral Communication Interconnect Express (PCIe) switch configured to:
   interface between an information handling system and a plurality of storage resources, wherein the storage resources comprise solid state storage devices;
   overlay memory address space of a destination logical unit for the write operation onto a source address, the destination logical unit including two or more of the plurality of storage resources;
   generate a source address for each storage resource of the destination logical unit based upon a determination that the destination logical unit is a RAID0 array; and
   multicast, from the PCIe switch, a plurality of transaction layer packets, each transaction layer packet associated with a corresponding storage resource of the destination logical unit.

15. A PCIe switch according to claim 14, the write operation defined by a ring descriptor.

16. A PCIe switch according to claim 14, each generated destination address having an offset based on a stripe size of the source logical unit and its associated storage resource.

* * * * *